(12) United States Patent
Toyama

(10) Patent No.: US 11,480,092 B2
(45) Date of Patent: Oct. 25, 2022

(54) COOLING APPARATUS FOR TURBOCHARGED ENGINE

(71) Applicant: TOYOTA JIDOSHA KABUSHIKI KAISHA, Toyota (JP)

(72) Inventor: Yoshiaki Toyama, Toyota (JP)

(73) Assignee: TOYOTA JIDOSHA KABUSHIKI KAISHA, Toyota (JP)

(\*) Notice: Subject to any disclaimer, the term of this patent is extended or adjusted under 35 U.S.C. 154(b) by 0 days.

(21) Appl. No.: 17/493,179

(22) Filed: Oct. 4, 2021

(65) Prior Publication Data

US 2022/0213831 A1 Jul. 7, 2022

(30) Foreign Application Priority Data

Jan. 7, 2021 (JP) .............................. JP2021-001645

(51) Int. Cl.
| | |
|---|---|
| *F01P 3/20* | (2006.01) |
| *F01P 3/02* | (2006.01) |
| *F01P 5/10* | (2006.01) |
| *F01P 7/14* | (2006.01) |
| *F02F 1/36* | (2006.01) |

(Continued)

(52) U.S. Cl.
CPC ............ *F01P 3/20* (2013.01); *F01P 3/02* (2013.01); *F01P 5/10* (2013.01); *F01P 7/14* (2013.01); *F02F 1/36* (2013.01); *F02M 31/20* (2013.01); *F02P 5/14* (2013.01); *F01P 2003/024* (2013.01); *F01P 2005/105* (2013.01); *F01P 2007/146* (2013.01); *F01P 2060/12* (2013.01)

(58) Field of Classification Search
CPC ........ F01P 3/20; F01P 3/02; F01P 5/10; F01P 7/14; F01P 2003/024; F01P 2007/146; F01P 2060/12; F01P 2005/105; F02F 1/36; F02M 31/20; F02P 5/14
See application file for complete search history.

(56) References Cited

U.S. PATENT DOCUMENTS

2020/0208579 A1\* 7/2020 Hikitani .................. F01P 7/164

FOREIGN PATENT DOCUMENTS

JP 2010-48187 A 3/2010

\* cited by examiner

*Primary Examiner* — Jacob M Amick
(74) *Attorney, Agent, or Firm* — Oblon, McClelland, Maier & Neustadt, L.L.P.

(57) ABSTRACT

In a cooling apparatus including a high-temperature-side radiator in a high-temperature-side cooling circuit supplying a high-temperature coolant to a cylinder head, a low-temperature-side radiator in a low-temperature-side cooling circuit supplying a low-temperature coolant to an intercooler, and an electronic control unit, the high-temperature-side cooling circuit includes a first coolant passage where the high-temperature coolant flows around an exhaust port, a second coolant passage where the high-temperature coolant flows through the cylinder head without flowing around the exhaust port, and a flow rate adjustment valve adjusting a flow rate of the high-temperature coolant flowing through the first coolant passage. The electronic control unit executes a response improvement process for controlling the flow rate adjustment valve to reduce the flow rate of the high-temperature coolant flowing through the first coolant passage, and for controlling the low-temperature-side pump to increase a flow rate of the low-temperature coolant circulating through the low-temperature-side cooling circuit.

6 Claims, 8 Drawing Sheets

(51) Int. Cl.
*F02M 31/20* (2006.01)
*F02P 5/14* (2006.01)

COOLING APPARATUS FOR TURBOCHARGED ENGINE

CROSS-REFERENCE TO RELATED APPLICATION

This application claims priority to Japanese Patent Application No. 2021-001645 filed on Jan. 7, 2021, incorporated herein by reference in its entirety.

BACKGROUND

1. Technical Field

The present disclosure relates to a cooling apparatus for a turbocharged engine, and more particularly, to a cooling apparatus for an internal combustion engine including a turbocharger.

2. Description of Related Art

Japanese Unexamined Patent Application Publication No. 2010-048187 (JP 2010-048187 A) discloses a turbocharging system for an engine. The turbocharging system includes an in-housing coolant passage inside a turbine housing, and a flow rate adjustment valve configured to adjust a flow rate of a coolant flowing through the in-housing coolant passage. In the turbocharging system, the flow rate adjustment valve is closed when an accelerating state of the engine is detected. As a result, a decrease in an exhaust gas temperature is suppressed, and exhaust energy is increased. Therefore, a transient response of turbocharging is improved during acceleration.

SUMMARY

In general, a coolant is supplied around an exhaust port of a cylinder head. Therefore, an exhaust temperature (exhaust gas temperature) decreases when exhaust gas flows through the exhaust port before reaching a turbine. The technology described in JP 2010-048187 A has room for further improvement in the acceleration response of the vehicle including the turbocharged engine.

The present disclosure has been made in view of the problem described above, and provides a cooling apparatus for a turbocharged engine in which an acceleration response of a vehicle is improved.

An aspect of the present disclosure relates to a cooling apparatus for a turbocharged engine which includes a cylinder head, a turbocharger, and an intercooler. The cylinder head includes an exhaust port. The turbocharger includes a compressor disposed in an intake passage, and a turbine disposed on a downstream side of the exhaust port in an exhaust passage including a passage in the exhaust port. The intercooler is disposed on a downstream side of the compressor in the intake passage. The cooling apparatus includes a high-temperature-side cooling circuit, a low-temperature-side cooling circuit and an electronic control unit. The high-temperature-side cooling circuit includes a high-temperature-side pump configured to circulate a high-temperature coolant and a high-temperature-side cooling portion configured to cool the high-temperature coolant, and the high-temperature-side cooling circuit is configured to supply the high-temperature coolant to the cylinder head. The low-temperature-side cooling circuit includes a low-temperature-side pump configured to circulate a low-temperature coolant and a low-temperature-side cooling portion configured to cool the low-temperature coolant, and the low-temperature-side cooling circuit is configured to supply the low-temperature coolant to the intercooler. The high-temperature-side cooling portion and the low-temperature-side cooling portion are shared at least in part. The high-temperature-side cooling circuit includes a first coolant passage where the high-temperature coolant flows around the exhaust port, a second coolant passage where the high-temperature coolant flows through the cylinder head without flowing around the exhaust port, and a flow rate adjustment valve configured to adjust a flow rate of the high-temperature coolant flowing through the first coolant passage. The electronic control unit is configured to, in at least a part of an accelerating period from a start of acceleration of a vehicle including the turbocharged engine to an end of the acceleration, execute a response improvement process for controlling the flow rate adjustment valve to reduce the flow rate of the high-temperature coolant flowing through the first coolant passage, and controlling the low-temperature-side pump to increase a flow rate of the low-temperature coolant circulating through the low-temperature-side cooling circuit.

In the cooling apparatus according to the aspect described above, the electronic control unit may be configured to, in the response improvement process, control the flow rate adjustment valve to stop a flow of the high-temperature coolant through the first coolant passage.

In the cooling apparatus according to the aspect described above, the electronic control unit may be configured to, in the response improvement process, control the low-temperature-side pump to increase the flow rate of the low-temperature coolant as a decrease amount of the flow rate of the high-temperature coolant flowing through the first coolant passage increases.

In the cooling apparatus with the configuration described above, the electronic control unit may be configured to, in the response improvement process, control the low-temperature-side pump to increase the flow rate of the low-temperature coolant to increase a cooling performance of the low-temperature-side cooling circuit by an amount corresponding to a decrease in a cooling performance of the high-temperature-side cooling circuit in response to a decrease in a heat receiving amount of the high-temperature coolant from exhaust gas via the exhaust port.

In the cooling apparatus according to the aspect described above, the turbocharged engine may further include an ignition device. The electronic control unit may be configured to, in the response improvement process, control the ignition device to advance an ignition timing in response to an increase in the flow rate of the low-temperature coolant.

In the cooling apparatus according to the present disclosure, the response improvement process is executed in at least a part of the accelerating period. In the response improvement process, the flow rate adjustment valve is controlled to narrow the first coolant passage. As a result, the heat receiving amount of the high-temperature coolant from exhaust gas via the exhaust port is reduced, thereby suppressing a decrease in the exhaust temperature (exhaust energy). Thus, an intake air amount can be increased because of an increase in a turbocharging pressure. The high-temperature-side cooling portion and the low-temperature-side cooling portion are shared at least in part. Therefore, a margin of the cooling performance of the high-temperature-side cooling circuit that is generated by reducing the heat receiving amount of the high-temperature coolant can be allocated to the cooling performance of the low-temperature-side cooling circuit. Thus, the cooling performance for intake air can be increased by increasing the flow rate of the low-temperature coolant. According to the response improvement process in the cooling apparatus for the turbocharged engine, the acceleration response of the vehicle can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

When the number, quantity, amount, range, or any other numerical value of each element is described in first and second embodiments described below, the present disclosure is not limited to the described numerical value unless otherwise noted or unless the numerical value is definitely determined in theory. Structures and steps described in the first and second embodiments are not necessarily essential to the present disclosure unless otherwise noted or unless the structures and steps are definitely needed in theory.

The first embodiment of the present disclosure is described.

System Configuration Example

Figure 1:
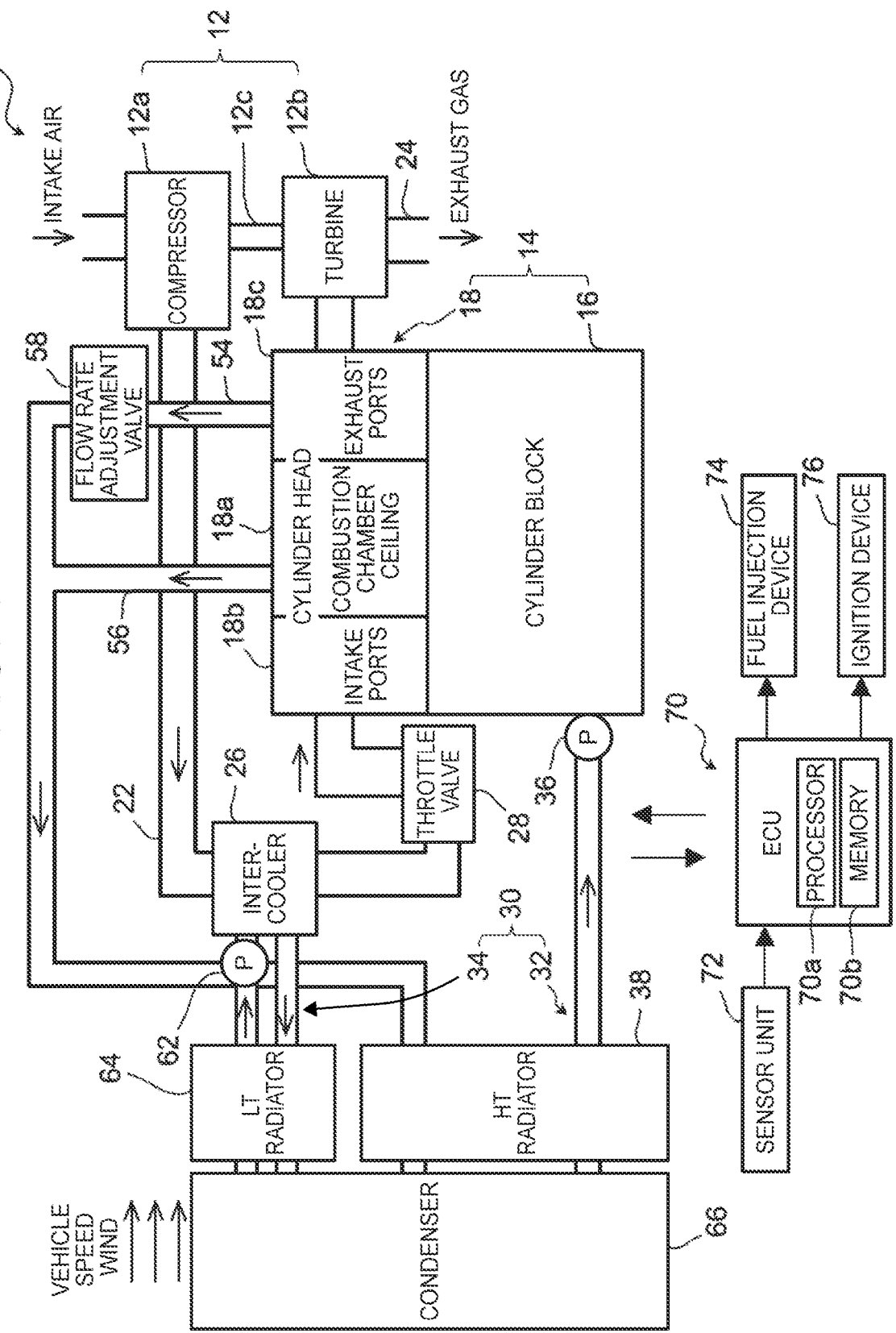
FIG. 1 is a schematic diagram illustrating the system configuration of a turbocharged engine according to a first embodiment of the present disclosure.

FIG. 1 is a schematic diagram illustrating the system configuration of a turbocharged engine 10 according to the first embodiment. The turbocharged engine 10 illustrated in FIG. 1 is an internal combustion engine including a turbocharger 12. More specifically, the turbocharged engine 10 is a spark-ignition engine as an example. The turbocharged engine 10 includes an engine body 14. The engine body 14 includes a cylinder block 16 and a cylinder head 18.

The cylinder head 18 includes a combustion chamber ceiling 18a, intake ports 18b, and exhaust ports 18c. An intake passage 22 and an exhaust passage 24 communicate with a combustion chamber 20 (see FIG. 2) of the turbocharged engine (hereinafter referred to simply as "engine" as well) 10. The intake passage 22 includes passages in the intake ports 18b. The exhaust passage 24 includes passages in the exhaust ports 18c.

The turbocharger 12 includes a compressor 12a and a turbine 12b. The compressor 12a is disposed in the intake passage 22, and is coupled to the turbine 12b via a coupling shaft 12c. The turbine 12b is disposed in the exhaust passage 24 on a downstream side of the exhaust ports 18c, and is rotated by exhaust gas discharged from the exhaust ports 18c. The compressor 12a is driven to rotate by the turbine 12b to compress intake air.

An intercooler 26 is disposed on a downstream side of the compressor 12a in the intake passage 22. The intercooler 26 cools the intake air compressed by the compressor 12a. The intercooler 26 is a water-cooled intercooler as described later. An electronically controlled throttle valve 28 is disposed on a downstream side of the intercooler 26. An intake air amount is controlled by adjusting the opening degree of the throttle valve 28. To control a turbocharging pressure, the engine 10 may include a wastegate mechanism or a variable nozzle mechanism.

The turbocharged engine 10 includes a cooling apparatus 30. The cooling apparatus 30 includes a high-temperature-side cooling circuit (HT cooling circuit) 32 and a low-temperature-side cooling circuit (LT cooling circuit) 34. The HT cooling circuit 32 supplies a coolant to the engine body 14 including the cylinder head 18. The LT cooling circuit 34 supplies the coolant to the intercooler 26. Since the HT cooling circuit 32 cools the engine body 14 having a higher temperature than that of the intercooler 26, the coolant flowing through the HT cooling circuit 32 is referred to as "high-temperature (HT) coolant". The coolant flowing through the LT cooling circuit 34 is referred to as "low-temperature (LT) coolant".

Next, the HT cooling circuit is described. The HT cooling circuit 32 includes a high-temperature-side pump (HT pump) 36 and a high-temperature-side radiator (HT radiator) 38. The HT pump 36 circulates the HT coolant through the HT cooling circuit 32. For example, the HT pump 36 is mounted on the cylinder block 16, and is driven to rotate by a crankshaft of the engine 10. The HT radiator 38 cools the HT coolant by exchanging heat with air (outside air).

The high-temperature coolant forced by the HT pump 36 flows through the cylinder block 16, the cylinder head 18, and the HT radiator 38 in this order. A specific example of the structures of coolant passages of the HT coolant around the cylinder head 18 is described with reference to FIG. 2 together with FIG. 1.

Figure 2:
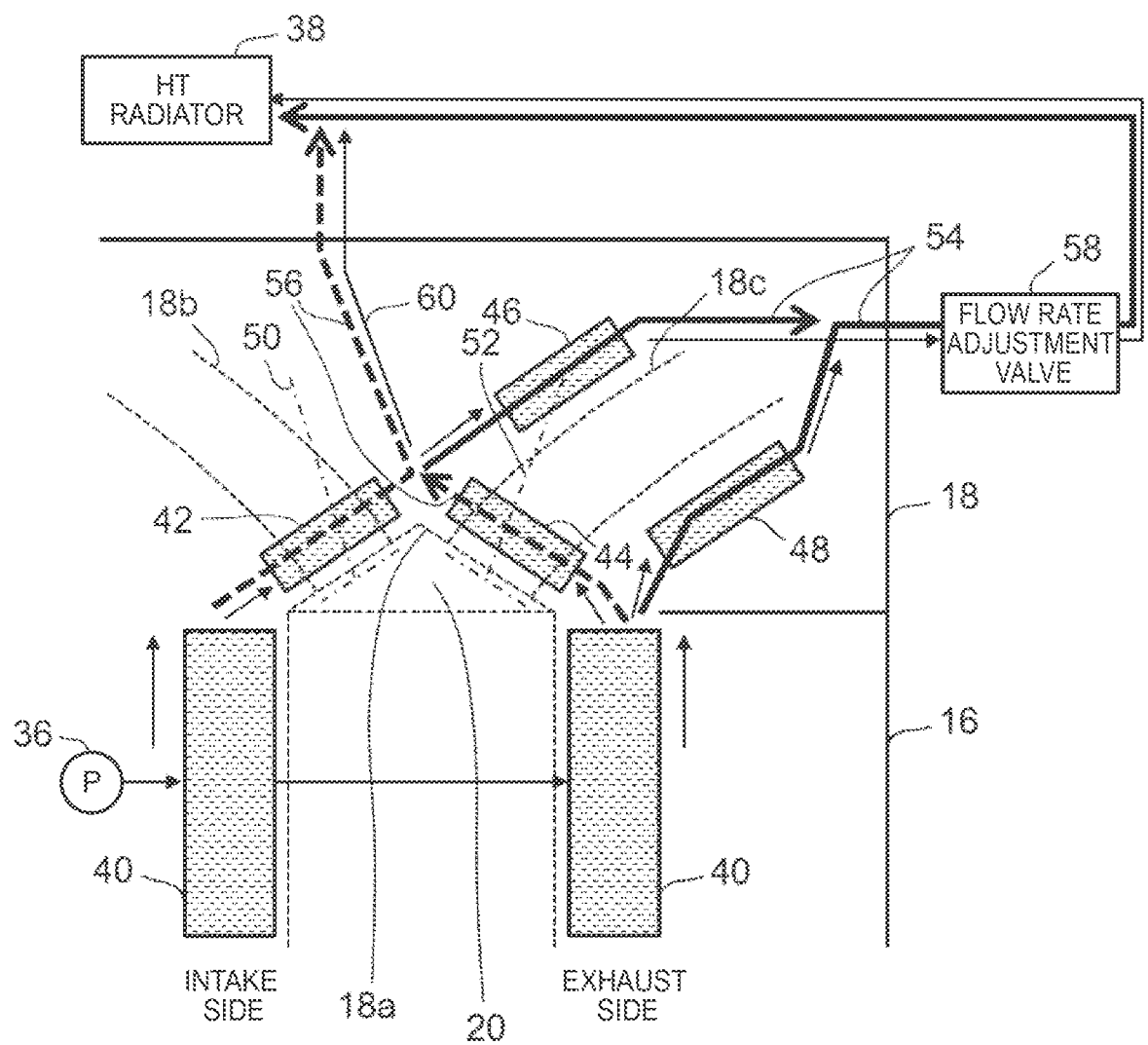
FIG. 2 is a schematic diagram illustrating an example of the structures of coolant passages around a cylinder head illustrated in FIG. 1.

FIG. 2 is a schematic diagram illustrating the example of the structures of the coolant passages around the cylinder head 18. FIG. 2 illustrates the internal structure of the engine body 14 viewed in an axial direction of the crankshaft. The HT cooling circuit 32 includes an in-block water jacket (WJ) 40, an inter-intake valve WJ 42, an inter-exhaust valve WJ 44, an upper exhaust port WJ 46, and a lower exhaust port WJ 48. The in-block WJ 40 is formed on the outer periphery of cylinder bores in the cylinder block 16. In FIG. 2, portions of the in-block WJ 40 on an intake side and an exhaust side communicate with each other in a circumferential direction of each cylinder bore. The inter-intake valve WJ 42 is formed between adjacent intake valves 50 arrayed along the axial direction of the crankshaft. Similarly, the inter-exhaust valve WJ 44 is formed between adjacent exhaust valves 52. The upper exhaust port WJ 46 and the lower exhaust port WJ 48 are formed above and below the exhaust ports 18c (that is, around the exhaust ports 18c).

The HT cooling circuit 32 includes a first coolant passage 54 and a second coolant passage 56 formed by using the in-block WJ 40, the inter-intake valve WJ 42, the inter-exhaust valve WJ 44, the upper exhaust port WJ 46, and the lower exhaust port WJ 48 as main components. The first coolant passage 54 is a path where the HT coolant flows around the exhaust ports 18c (wide continuous arrows). The second coolant passage 56 is a path where the HT coolant flows through the cylinder head 18 without flowing around the exhaust ports 18c (wide dashed arrows). More specifically, the second coolant passage 56 is a path where the HT coolant flows through the cylinder head 18 at a place separated from the exhaust ports 18c rather than portions around the exhaust ports 18c.

The HT cooling circuit 32 further includes a flow rate adjustment valve 58 configured to adjust a flow rate of the HT coolant flowing through the first coolant passage 54. For example, the flow rate adjustment valve 58 is an electric valve, and can change the flow rate of the HT coolant flowing around the exhaust ports 18c (including zero (that is, a flow stop state)). For example, the flow rate adjustment valve 58 is disposed in the first coolant passage 54 at a part located outside the cylinder head 18.

The HT coolant flowing into the intake side of the in-block WJ 40 from the HT pump 36 branches into a path where the HT coolant flows toward the inter-intake valve WJ 42 and a path where the HT coolant flows through the in-block WJ 40 from the intake side to the exhaust side along the cylinder bores and then flows toward an exhaust side of the cylinder head 18. The subsequent path of the HT coolant varies depending on whether the flow rate adjustment valve 58 is open or closed.

First, description is given of flows of HT coolant around the cylinder head 18 in an open state of the flow rate adjustment valve 58. In the open state, the HT coolant flowing through the inter-intake valve WJ 42 branches into a path where the HT coolant flows toward the upper exhaust port WJ 46 and a path 60 where the HT coolant flows out of the cylinder head 18 without flowing through the upper exhaust port WJ 46. The HT coolant flowing into the exhaust side of the cylinder head 18 from the exhaust side of the in-block WJ 40 branches into a path where the HT coolant flows toward the inter-exhaust valve WJ 44 and a path where the HT coolant flows toward the lower exhaust port WJ 48. The HT coolant flowing through the inter-exhaust valve WJ 44 branches into the path 60 and the path where the HT coolant flows toward the upper exhaust port WJ 46. The streams of HT coolant flowing out of the upper exhaust port WJ 46 and the lower exhaust port WJ 48 join each other, flow through the flow rate adjustment valve 58, and join the HT coolant flowing through the path 60.

In the open state, the HT coolant flows both in the first coolant passage 54 and in the second coolant passage 56. Specifically, as illustrated in FIG. 2, the HT coolant in the first coolant passage 54 flows around the exhaust ports 18c (upper exhaust port WJ 46 and lower exhaust port WJ 48) and through the flow rate adjustment valve 58 in this order. The HT coolant in the second coolant passage 56 flows through the inter-intake valve WJ 42 and the path 60 and through the inter-exhaust valve WJ 44 and the path 60.

In a closed state of the flow rate adjustment valve 58, the HT coolant around the exhaust ports 18c (upper exhaust port WJ 46 and lower exhaust port WJ 48) stops flowing. In the closed state, the HT coolant does not flow in the first coolant passage 54, but flows only in the second coolant passage 56. In the closed state, the HT coolant stagnates around the exhaust ports 18c. Therefore, the HT coolant stops cooling the exhaust ports 18c (the cooling is at least suppressed sufficiently), and continues to cool the portions around the combustion chamber ceiling 18a and the intake ports 18b. Instead of the example in which the flow rate adjustment valve 58 is closed (totally closed), the opening degree of the flow rate adjustment valve 58 may be reduced to reduce the flow rate of the HT coolant flowing around the exhaust ports 18c, thereby reducing a heat receiving amount of the HT coolant from the exhaust gas via the exhaust ports 18c.

The structures of the first and second coolant passages are not limited to those in the example illustrated in FIG. 1 and FIG. 2. That is, the first coolant passage may be structured in any way as long as the HT coolant flows around the exhaust ports, and the second coolant passage may be structured in any way as long as the HT coolant flows through the cylinder head without flowing around the exhaust ports. For example, the first coolant passage and the second coolant passage may be structured such that the HT coolant does not branch inside the cylinder head 18 but completely branches when flowing into the cylinder head from the cylinder block.

Any flow rate adjustment valve may be employed as long as the valve can adjust the flow rate of the HT coolant flowing through the first coolant passage. The arrangement position and the structure of the flow rate adjustment valve are not limited to those in the example of the flow rate adjustment valve 58.

Next, the LT cooling circuit is described. As illustrated in FIG. 1, the LT cooling circuit 34 includes a low-temperature-side pump (LT pump) 62 and a low-temperature-side radiator (LT radiator) 64. The LT pump 62 circulates the LT coolant through the LT cooling circuit 34. For example, the LT pump 62 is an electric pump. For example, the LT pump 62 is disposed between an inlet of the intercooler 26 and an outlet of the LT radiator 64, but the arrangement position is not particularly limited. The LT radiator 64 cools the LT coolant by exchanging heat with air (outside air). Although illustration is omitted in FIG. 1, the LT cooling circuit 34 may also cool the turbocharger (T/C) 12 as in an example of FIG. 5 described later.

Next, sharing of a high-temperature-side cooling portion and a low-temperature-side cooling portion is described. As illustrated in FIG. 1, the vehicle including the turbocharged engine 10 includes a condenser 66. The condenser 66 is a component of a refrigeration circuit for air conditioning in a vehicle cabin, and is a heat exchanger configured to cool and condense a refrigerant (air conditioning refrigerant) flowing through the refrigeration circuit. Specifically, the condenser 66 cools the air conditioning refrigerant by exchanging heat with air (outside air).

In this embodiment, the condenser 66 is structured such that the HT coolant in the HT cooling circuit 32 can exchange heat with the air conditioning refrigerant in the condenser 66. More specifically, as illustrated in FIG. 1, the HT cooling circuit 32 is structured such that the HT coolant flowing through the HT radiator 38 flows through the condenser 66 and then flows through the HT radiator 38 again. Similarly, the condenser 66 is structured such that the LT coolant in the LT cooling circuit 34 can exchange heat with the air conditioning refrigerant in the condenser 66. More specifically, the LT cooling circuit 34 is structured such that the LT coolant flowing through the LT radiator 64 flows through the condenser 66 and then flows through the LT radiator 64 again.

As illustrated in FIG. 1, the condenser 66 is mounted on the vehicle on an upstream side of a vehicle speed wind (movement wind generated by traveling of the vehicle) with respect to the HT radiator 38 and the LT radiator 64. The HT radiator 38 and the LT radiator 64 are arrayed in a direction orthogonal to a flowing direction of the vehicle speed wind. During the traveling of the vehicle, the air conditioning refrigerant, the HT coolant, and the LT coolant in the condenser 66 are cooled by the vehicle speed wind. In the HT radiator 38, the HT coolant is further cooled by the vehicle speed wind having flowed through the condenser 66. In the LT radiator 64, the LT coolant is further cooled similarly by the vehicle speed wind having flowed through the condenser 66.

In the configuration example illustrated in FIG. 1, the HT radiator 38 is an example of "high-temperature-side cooling portion" according to the present disclosure. The LT radiator 64 is an example of "low-temperature-side cooling portion" according to the present disclosure. The HT coolant and the LT coolant introduced into the condenser 66 structured as described above are cooled in the condenser 66 and exchange heat with each other via the air conditioning refrigerant while the refrigeration circuit is operating (an air conditioner is operating) and also stopping. In the configuration example illustrated in FIG. 1, the "high-temperature-side cooling portion" and the "low-temperature-side cooling portion" are shared in part by the condenser 66.

The "high-temperature-side cooling portion" and the "low-temperature-side cooling portion" may be shared as follows instead of the example illustrated in FIG. 1. For example, the low-temperature coolant may flow through a part of the high-temperature-side radiator corresponding to the "high-temperature-side cooling portion". Conversely, the high-temperature coolant may flow through a part of the low-temperature-side radiator corresponding to the "low-temperature-side cooling portion". The "high-temperature-side cooling portion" and the "low-temperature-side cooling portion" may be shared entirely. For example, the radiator that cools the high-temperature coolant and the radiator that cools the low-temperature coolant may be integrated together.

Next, an electronic control unit is described. The system illustrated in FIG. 1 further includes an electronic control unit (ECU) 70. The ECU 70 includes a processor 70a and a memory 70b. The memory 70b stores various control programs and various types of data including maps for use in control on the turbocharged engine 10 including control on the cooling apparatus 30. The processor 70a reads and executes the control programs in the memory 70b to implement various processes and various types of control by the ECU 70. The number of ECUs 70 may be plural. The ECU 70 corresponds to an example of "electronic control unit" according to the present disclosure.

The ECU 70 acquires sensor signals from a sensor unit 72 for use in the control on the engine 10. The sensor unit 72 includes various sensors mounted on the engine 10 (for example, a crank angle sensor, an engine coolant temperature sensor, an airflow sensor, and an intake temperature sensor), and various sensors mounted on the vehicle (for example, an accelerator position sensor and a vehicle speed sensor). Actuators to be controlled by the ECU 70 include the throttle valve 28, the flow rate adjustment valve 58, and the LT pump 62, and also include a fuel injection device 74 and an ignition device 76 of the engine 10.

Next, description is given of control for improving an acceleration response according to the first embodiment. In this embodiment, the ECU 70 executes the following "response improvement process" to improve the acceleration response of the vehicle including the turbocharged engine 10. In the response improvement process, during an accelerating period TACC from the start to the end of acceleration of the vehicle, the ECU 70 controls the flow rate adjustment valve 58 to reduce an HT flow rate $V_{HTex}$, and controls the LT pump 62 to increase an LT flow rate $V_{LT}$. The HT flow rate $V_{HTex}$ is a flow rate of the HT coolant flowing through the first coolant passage 54 where the HT coolant flows around the exhaust ports 18c. The LT flow rate $V_{LT}$ is a flow rate of the LT coolant circulating through the LT cooling circuit 34. For example, the flow rate adjustment valve 58 is controlled in this embodiment to stop the flow of the HT coolant through the first coolant passage 54.

More specifically, in the response improvement process of this embodiment, the ECU 70 controls the LT pump 62 to increase the LT flow rate $V_{LT}$ to increase a cooling performance $Qw_{LT}$ of the LT cooling circuit 34 by an amount corresponding to a decrease in a cooling performance $Qw_{HT}$ of the HT cooling circuit 32 in response to a decrease in the heat receiving amount of the HT coolant from the exhaust gas via the exhaust ports 18c.

In the response improvement process of this embodiment, the ECU 70 advances an ignition timing in response to the increase in the flow rate $V_{LT}$ of the LT coolant.

Figure 3:
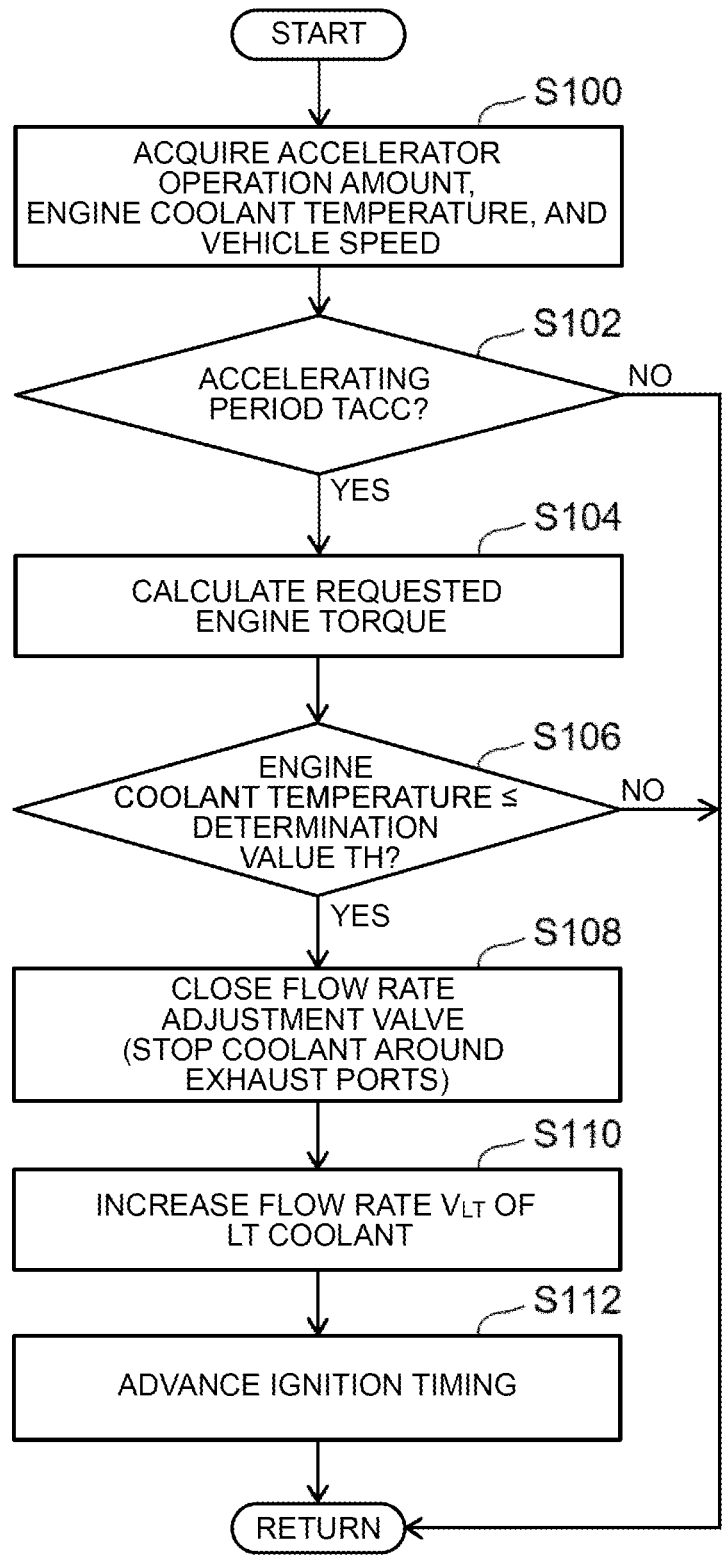
FIG. 3 is a flowchart illustrating an example of a flow of a response improvement process during acceleration according to the first embodiment.

FIG. 3 is a flowchart illustrating an example of a flow of the response improvement process during the acceleration according to the first embodiment. The process in this flowchart is repeated during operation of the turbocharged engine 10.

In FIG. 3, the ECU 70 first acquires an accelerator operation amount, an engine coolant temperature, and a vehicle speed in Step S100. For example, the accelerator operation amount can be acquired by using the accelerator position sensor. For example, the engine coolant temperature (HT coolant temperature) can be acquired by using the engine coolant temperature sensor attached to the cylinder block 16. For example, the vehicle speed can be acquired by using the vehicle speed sensor. Then, the process proceeds to Step S102.

In Step S102, the ECU 70 determines whether the vehicle is in the accelerating period TACC (the vehicle is in an accelerating state). The acceleration of the vehicle includes acceleration from a stopped state of the vehicle, and acceleration to be started during the traveling of the vehicle. For example, the ECU 70 detects an acceleration request (in other words, determines that the acceleration is started) when the accelerator operation amount (accelerator pedal depression amount) is equal to or larger than a predetermined determination value. For example, the ECU 70 determines that the accelerating period TACC is ended when the vehicle speed detected by the vehicle speed sensor reaches a target vehicle speed determined depending on the accelerator operation amount. The determination method for the accelerating period TACC is not limited to this method, and may be any publicly known method.

When the ECU 70 determines in Step S102 that the accelerating period TACC has not come, the ECU 70 terminates the current processing cycle. When the accelerating period TACC has come, the process proceeds to Step S104.

In Step S104, the ECU 70 calculates a requested engine torque. For example, the requested engine torque is calculated to increase as the accelerator operation amount increases. Then, the process proceeds to Step S106.

In Step S106, the ECU 70 determines whether the engine coolant temperature (HT coolant temperature) is equal to or lower than a predetermined determination value TH. The determination value TH is a threshold of the engine coolant temperature (for example, 100° C.) for determining whether the reliability of the exhaust system can be secured even if the flow rate adjustment valve 58 is closed to stop the coolant flow around the exhaust ports 18c.

When the engine coolant temperature is higher than the determination value TH in Step S106, the ECU 70 terminates the current processing cycle. More specifically, the response improvement process for the current accelerating period TACC (Steps S108 to S112) is not executed when the process proceeds to Step S106 for the first time after the accelerating period TACC has come and the determination result of Step S106 is negative. The currently executed response improvement process is halted when the process proceeds to Step S106 during an elapse of the accelerating period TACC and the determination result of Step S106 is negative. With the process of Step S106, the response improvement process can be executed while securing the reliability of the exhaust system.

When the engine coolant temperature is equal to or lower than the determination value TH in Step S106, the process proceeds to Step S108. In Step S108, the ECU 70 closes the flow rate adjustment valve 58 to stop the flow of the HT coolant around the exhaust ports 18c. Then, the process proceeds to Step S110.

In Step S110, the ECU 70 calculates an increase amount $\Delta V_{LT}$ of the LT flow rate $V_{LT}$ for increasing the cooling performance $Qw_{LT}$ of the LT cooling circuit 34 by an amount corresponding to a decrease in the cooling performance $Qw_{HT}$ of the HT radiator 38 in response to a decrease in the heat receiving amount of the HT coolant from the exhaust gas via the exhaust ports 18c along with the process of Step S108. The ECU 70 controls the LT pump 62 to achieve the LT flow rate $V_{LT}$ increased by the calculated increase amount $\Delta V_{LT}$. For example, the increase amount $\Delta V_{LT}$ is calculated when the process proceeds to Step S110 for the first time after the accelerating period TACC has come. For example, the increase amount $\Delta V_{LT}$ can be calculated by a method described below with reference to FIG. 4 to FIG. 7.

Figure 4:
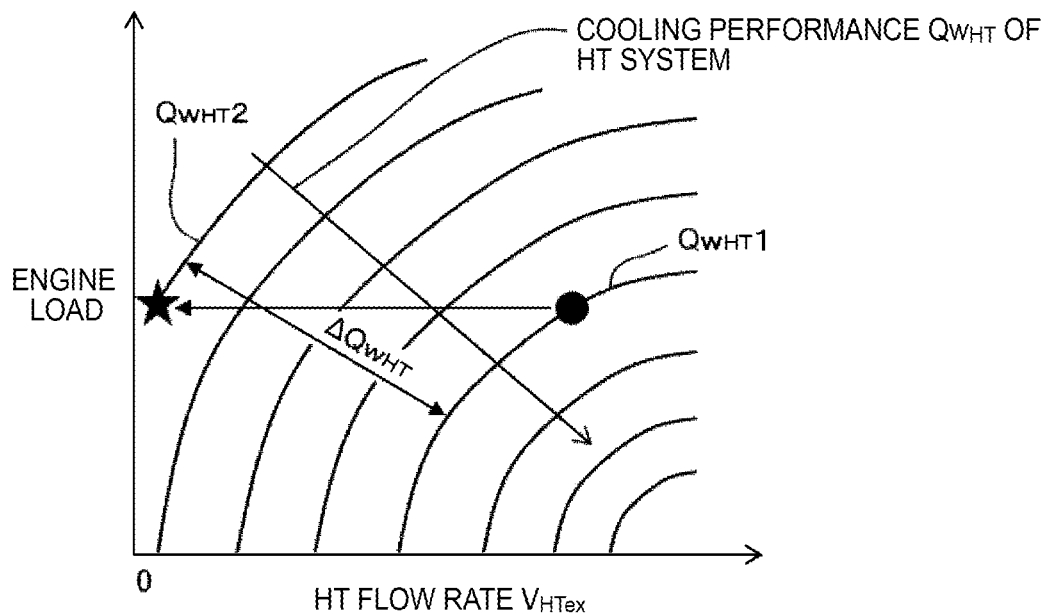
FIG. 4 is a graph illustrating a relationship of a cooling performance of a high-temperature cooling circuit (HT cooling circuit) relative to an engine load and a high-temperature flow rate (HT flow rate) in the turbocharged engine.

FIG. 4 is a graph illustrating a relationship of the cooling performance $Qw_{HT}$ of the HT cooling circuit 32 relative to an engine load and the HT flow rate $V_{HTex}$. As illustrated in FIG. 4, the cooling performance $Qw_{HT}$ (kW) of the HT cooling circuit 32 (HT system) increases as the engine load decreases, and increases as the HT flow rate $V_{HTex}$ increases. The memory 70b stores the relationship illustrated in FIG. 4 as a map.

Figure 9:
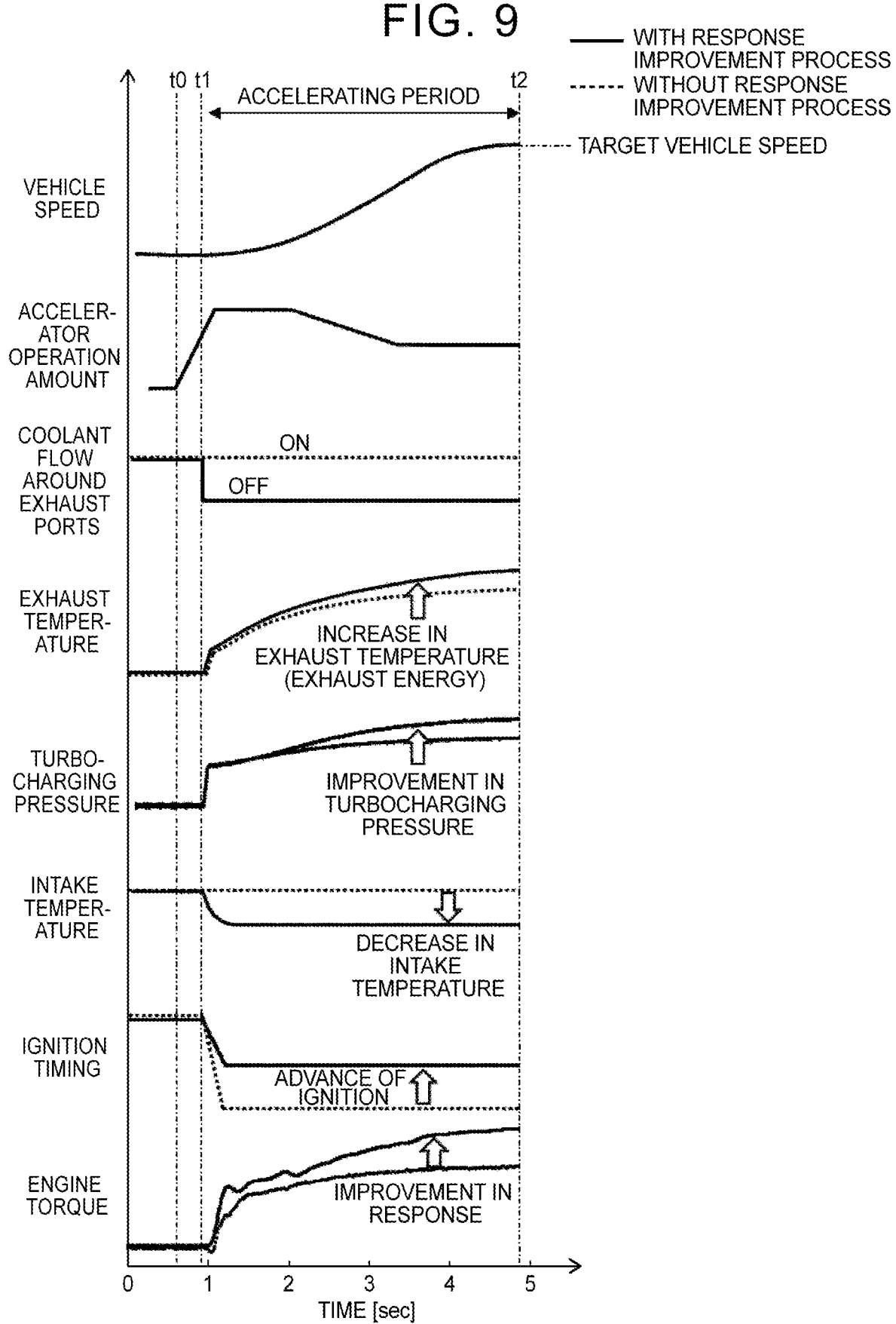
FIG. 9 is a time chart for describing operations during the acceleration along with the response improvement process according to the first embodiment.

From the map defining the relationship illustrated in FIG. 4, the ECU 70 calculates a cooling performance $Qw_{HT}1$ based on an engine load and an HT flow rate $V_{HTex}$ (value before the flow rate adjustment valve 58 is closed) at a time t1 when the accelerating period TACC has come (see FIG. 9). The ECU 70 also calculates, from the map, a cooling performance $Qw_{HT}2$ based on the engine load at the time t1 and an HT flow rate $V_{HTex}$ after the flow rate adjustment valve 58 is closed (that is, zero). The ECU 70 calculates a difference $\Delta Qw_{HT}$ between the cooling performances $Qw_{HT}1$ and $Qw_{HT}2$ ($=Qw_{HT}2-Qw_{HT}1$). The difference $\Delta Qw_{HT}$ corresponds to a margin of the cooling performance $Qw_{HT}$ generated by reducing the HT flow rate $V_{HTex}$. For example, the engine load (engine load factor based on a charging rate of intake air) can be calculated based on an intake air amount that is based on an output from the airflow sensor and an engine speed that is based on an output from the crank angle sensor. For example, the HT flow rate $V_{HTex}$ before the flow rate adjustment valve 58 is closed can be calculated based on a rotation speed of the HT pump 36 that is based on the engine speed.

Figure 5:
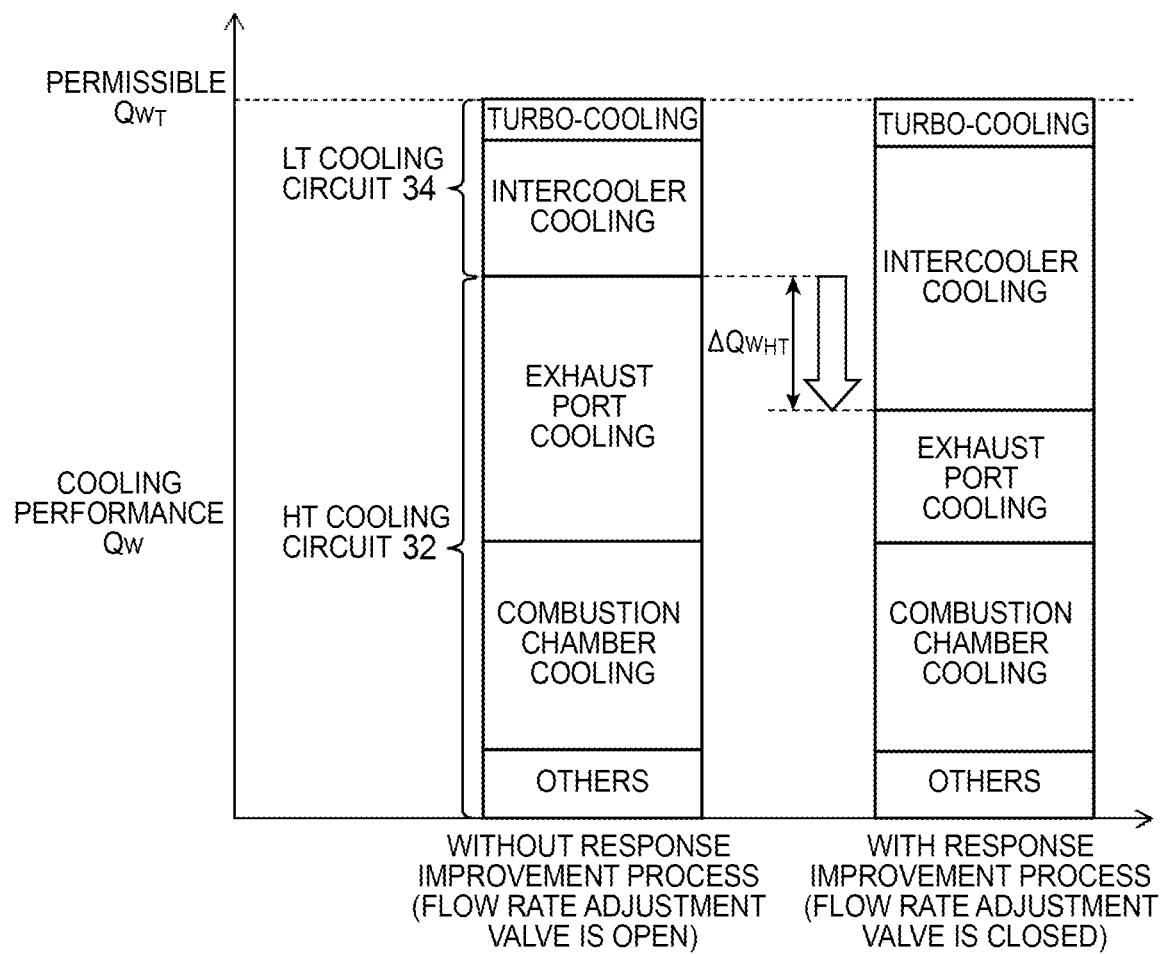
FIG. 5 is a graph illustrating cooling performances of the HT cooling circuit and a low-temperature cooling circuit (LT cooling circuit) in the turbocharged engine.

FIG. 5 is a graph illustrating the cooling performances Qw of the HT cooling circuit 32 and the LT cooling circuit 34. FIG. 5 illustrates relationships between the cooling performances Qw (kW) of the HT cooling circuit 32 and the LT cooling circuit 34 in two examples. In the first example, the response improvement process is not executed (that is, the flow rate adjustment valve 58 is open). In the second example, the response improvement process is executed (that is, the flow rate adjustment valve 58 is closed).

In FIG. 5, $Qw_T$ corresponds to a total permissible cooling performance of the HT cooling circuit 32 and the LT cooling circuit 34. The HT radiator 38 and the LT radiator 64 are cooled by the vehicle speed wind (cooling wind) via the common condenser 66. As illustrated in FIG. 5, the permissible cooling performance (total cooling performance) $Qw_T$ is determined as the total of the cooling performances of the HT cooling circuit 32 and the LT cooling circuit 34. Thus, when the flow rate adjustment valve 58 is closed to stop the cooling around the exhaust ports 18c through the process of Step S108, the cooling performance corresponding to the margin $\Delta Qw_{HT}$ can be allocated to the cooling in the LT cooling circuit 34.

Figure 6:
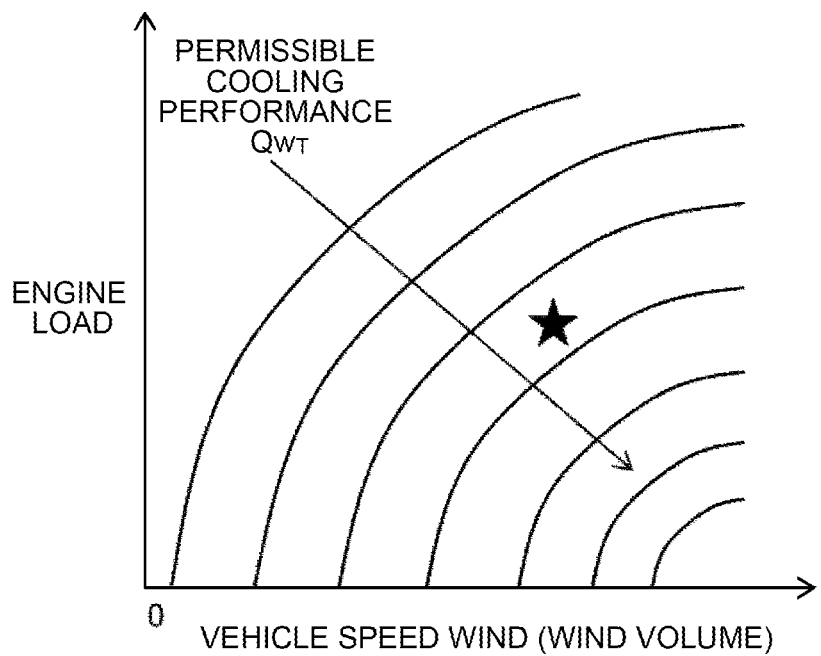
FIG. 6 is a graph illustrating a relationship of a permissible cooling performance relative to the engine load and a vehicle speed wind (wind volume) in the turbocharged engine.

FIG. 6 is a graph illustrating a relationship of the permissible cooling performance $Qw_T$ relative to the engine load and the vehicle speed wind (wind volume). As illustrated in FIG. 6, the permissible cooling performance $Qw_T$ increases as the engine load decreases, and increases as the wind volume of the vehicle speed wind increases. The memory 70b stores the relationship illustrated in FIG. 6 as a map. The ECU 70 calculates, from the map, a permissible cooling performance $Qw_T$ based on the engine load and a wind volume at the time t1. The ECU 70 calculates a difference between the calculated permissible cooling performance $Qw_T$ and the margin $\Delta Qw_{HT}$ ($=Qw_T-\Delta Qw_{HT}$). The difference is handled as an increasable amount $\Delta Qw_{LT}$ of the cooling performance $Qw_{LT}$ of the LT cooling circuit 34. The wind volume of the vehicle speed wind increases as the vehicle speed increases. Therefore, the wind volume can be calculated based on the vehicle speed.

Figure 7:
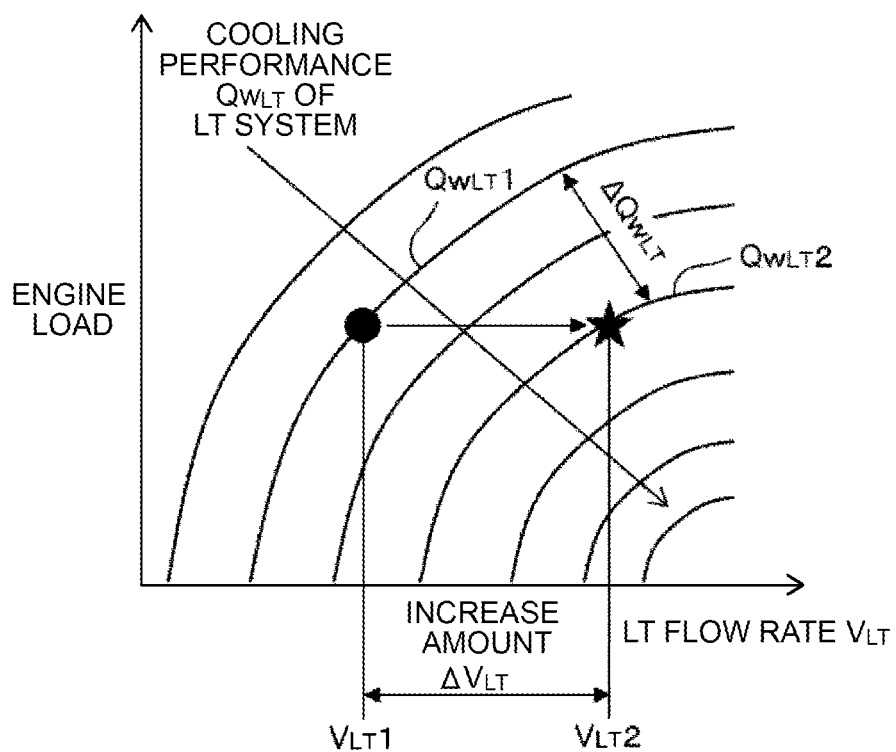
FIG. 7 is a graph illustrating a relationship of the cooling performance of the low-temperature cooling circuit (LT cooling circuit) relative to the engine load and a low-temperature flow rate (LT flow rate) in the turbocharged engine.

FIG. 7 is a graph illustrating a relationship of the cooling performance $Qw_{LT}$ of the LT cooling circuit 34 relative to the engine load and the LT flow rate $V_{LT}$. As illustrated in FIG. 7, the cooling performance $Qw_{LT}$ decreases as the engine load increases, and increases as the LT flow rate $V_{LT}$ increases. The memory 70b stores the relationship illustrated in FIG. 7 as a map. The ECU 70 calculates, from the map, a cooling performance $Qw_{LT}1$ based on the engine load and an LT flow rate $V_{LT}1$ at the time t1.

The ECU 70 calculates a cooling performance $Qw_{LT}2$ by adding the increasable amount $\Delta Qw_{LT}$ to the calculated cooling performance $Qw_{LT}1$, and calculates, from the map, an LT flow rate $V_{LT}2$ based on the cooling performance $Qw_{LT}2$ and the engine load at the time t1. The ECU 70 calculates an increase amount $\Delta V_{LT}$ that is a difference between the LT flow rates $V_{LT}1$ and $V_{LT}2$ $V_{LT}2-V_{LT}1$). For example, the LT flow rate $V_{LT}1$ at the time t1 can be calculated based on a rotation speed of the LT pump 62.

A decrease amount of the HT flow rate $V_{HTex}$ caused by closing the flow rate adjustment valve 58 increases as the HT flow rate $V_{HTex}$ before the flow rate adjustment valve 58 is closed increases. According to the method for calculating the increase amount $\Delta V_{LT}$ with reference to FIG. 4 to FIG. 7, the increase amount $\Delta V_{LT}$ is calculated to increase as the decrease amount of the HT flow rate $V_{HTex}$ increases.

Figure 8:
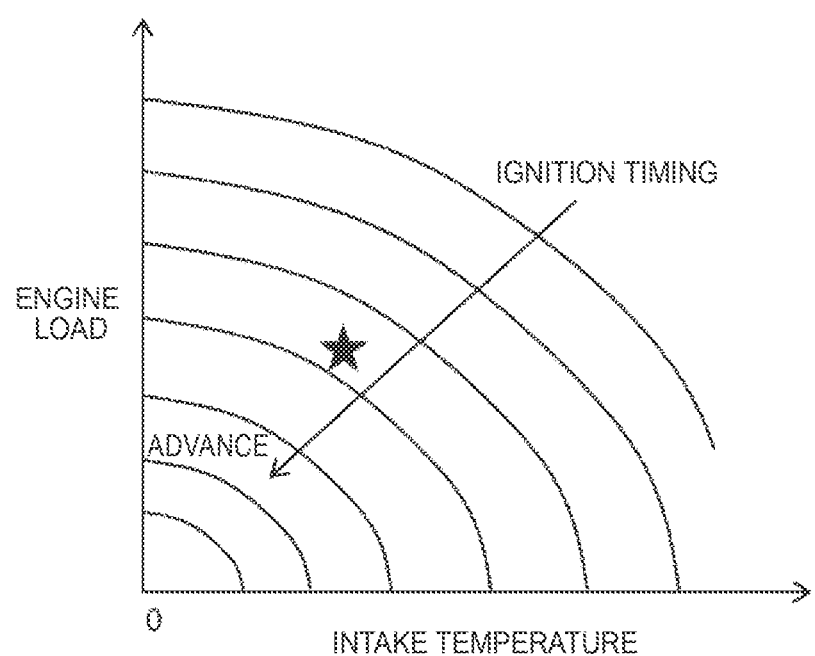
FIG. 8 is a graph illustrating a relationship of an ignition timing relative to the engine load and an intake temperature in the turbocharged engine.

In Step S112 subsequent to Step S110, the ECU 70 advances the ignition timing along with the increase in the LT flow rate $V_{LT}$ through the process of Step S110. FIG. 8 is a graph illustrating a relationship of the ignition timing relative to the engine load and an intake temperature. As illustrated in FIG. 8, the ignition timing is advanced more as the engine load decreases, and is advanced more as the intake temperature decreases. The intake temperature is a temperature of intake air having flowed through the intercooler 26. The memory 70b stores the relationship illustrated in FIG. 8 as a map. For example, the ECU 70 calculates, from the map, an ignition timing based on the engine load at the time t1 and an intake temperature (estimated value) after the LT flow rate $V_{LT}$ is increased. When the LT flow rate $V_{LT}$ is increased through the process of Step S110, the intake temperature decreases because the cooling of intake air is accelerated in the intercooler 26. Therefore, the calculated ignition timing is an advanced value as compared to the ignition timing before the LT flow rate $V_{LT}$ is increased.

The decrease amount of the intake temperature along with the increase in the LT flow rate $V_{LT}$ basically increases as the increase amount $\Delta V_{LT}$ increases. Therefore, the intake temperature (estimated value) to be used for determining an advancing amount of the ignition timing may be calculated, for example, to decrease as the increase amount $\Delta V_{LT}$ increases as compared to the value of the intake temperature at the time t1 that is detected by the intake temperature sensor.

FIG. 9 is a time chart for describing operations during the acceleration along with the response improvement process according to the first embodiment. In FIG. 9, continuous lines correspond to operations of the cooling apparatus of this embodiment during the acceleration along with the response improvement process, and dashed lines correspond to operations in a comparative example during the acceleration without the response improvement process. In FIG. 9, a time t0 corresponds to a time when a driver starts to depress the accelerator pedal (acceleration request). The time t1 after the time t0 corresponds to a time when the acceleration request is detected (that is, the vehicle starts to accelerate). As described above, the accelerating period TACC is started from the time t1.

According to the response improvement process, the flow rate adjustment valve 58 is closed at the time t1. As a result, the HT coolant stops flowing around the exhaust ports 18c (upper exhaust port WJ 46 and lower exhaust port WJ 48). Therefore, a decrease in an exhaust temperature (exhaust energy) due to the cooling of the exhaust ports 18c is suppressed. Thus, the exhaust temperature (exhaust energy) increases as compared to that in the comparative example (dashed line) as illustrated in FIG. 9. As a result, the turbocharging pressure can be increased because of an increase in a turbo-rotation speed. Since the coolant does not stop flowing around the combustion chamber ceiling 18a and the intake ports 18b, the exhaust energy can be improved without increasing the surface temperature of the combustion chamber 20 (that is, without increasing the possibility of knocking).

At the time t1, the LT flow rate $V_{LT}$ is increased in association with the stop of the coolant flow around the exhaust ports 18c. As a result, the cooling performance of the intercooler 26 for intake air can be increased. Therefore, the intake temperature decreases as compared to that in the comparative example as illustrated in FIG. 9.

When the intake temperature decreases, a compression end temperature in the cylinder decreases, thereby suppressing the occurrence of knocking. Therefore, the ignition timing is advanced at the time t1 in consideration of the decrease in the intake temperature along with the increase in the LT flow rate $V_{LT}$. More specifically, the ignition timing is advanced to approach an optimum ignition timing (Minimum advance for the Best Torque: MBT).

By executing the response improvement process, a response of the engine torque is improved as illustrated in FIG. 9. Specifically, the engine torque increases because of an increase in the intake air amount along with the increase in the turbocharging pressure and because of the advance of ignition and improvement in an intake air density along with the decrease in the intake temperature. As a result, the acceleration response is improved. By causing the ignition timing to approach MBT, thermal efficiency is improved.

In FIG. 9, a time t2 corresponds to a time when the vehicle speed reaches the target vehicle speed that is based on the accelerator operation amount. In the example illustrated in FIG. 9, the response improvement process is terminated at the time t2. That is, the supply of the HT coolant around the exhaust ports 18c is resumed after the passage through the time t2. In the example illustrated in FIG. 9, the accelerating period TACC is ended at the time t2. The time to reach the target vehicle speed for use as the time to terminate the response improvement process is not limited to the time when the acceleration is ended. That is, the target vehicle speed to be reached in the example in which the response improvement process is terminated may be a predetermined vehicle speed value during the acceleration.

The response improvement process need not essentially be executed for the entire accelerating period TACC. For example, the response improvement process may be executed during a period from the start of the acceleration to a time when the accelerator operation amount during the acceleration decreases to a predetermined operation amount larger than the operation amount before the acceleration (that is, the acceleration request level decreases to a certain level or lower after the start of the acceleration).

Next, description is given of effects of the cooling apparatus for the turbocharged engine according to the first embodiment. As described above, in the response improvement process according to the first embodiment, the flow rate adjustment valve 58 is controlled during the accelerating period TACC to narrow the first coolant passage 54. For example, the flow rate adjustment valve 58 is closed to stop the coolant flow in the first coolant passage 54. As a result, the heat receiving amount of the HT coolant from the exhaust gas via the exhaust ports 18c is reduced, thereby suppressing a decrease in the exhaust temperature (exhaust energy). Thus, the intake air amount can be increased because of an increase in the turbocharging pressure. A part of the cooler in the HT cooling circuit 32 (high-temperature-side cooling portion) is shared with the cooler in the LT cooling circuit 34 (low-temperature-side cooling portion). Therefore, the margin $\Delta Qw_{HT}$ of the cooling performance $Qw_{HT}$ of the HT cooling circuit 32 that is generated by reducing the heat receiving amount of the HT coolant can be allocated to the cooling performance $Qw_{LT}$ of the LT cooling circuit 34. Thus, the cooling performance for intake air can be increased by increasing the LT flow rate $V_{LT}$, thereby improving the intake air density. According to the response improvement process described above, the acceleration response of the vehicle can be improved.

The decrease amount of the exhaust temperature is basically larger during passage through the exhaust ports 18c than passage through the turbine 12b. Therefore, the suppression of the cooling of the exhaust ports 18c through the reduction of the coolant flow around the exhaust ports 18c can suppress the decrease in the exhaust temperature (exhaust energy) more effectively than a case where the cooling of the turbine 12b is suppressed.

In the response improvement process of the first embodiment, the flow rate $V_{LT}$ of the LT coolant is increased to increase the cooling performance $Qw_{LT}$ of the LT cooling circuit 34 by the amount corresponding to the decrease in the cooling performance $Qw_{HT}$ of the HT cooling circuit 32 (margin $\Delta Qw_{HT}$) in response to the decrease in the heat receiving amount of the HT coolant at the exhaust ports 18c. Thus, the margin $\Delta Qw_{HT}$ generated by reducing the heat receiving amount of the HT coolant can appropriately be allocated to the cooling performance $Qw_{LT}$ of the LT cooling circuit 34.

In the response improvement process of the first embodiment, the ignition timing is advanced in response to the increase in the flow rate $V_{LT}$ of the LT coolant (that is, the decrease in the intake temperature). Thus, the effect of the increase in the engine torque because of the advance of ignition can be added to the effect of the increase in the engine torque because of the increase in the intake air amount along with the increase in the turbocharging pressure. As a result, the acceleration response can further be improved. If the ignition timing is advanced while simply reducing the intake temperature, the exhaust temperature (exhaust energy) decreases due to advance of the center of combustion. According to the response improvement process, the decrease in the exhaust energy is suppressed by reducing the coolant flow around the exhaust ports 18c. Therefore, more exhaust energy can be supplied to the turbine 12b while advancing the ignition along with the decrease in the intake temperature. Thus, the acceleration response can be improved more effectively.

Next, modified examples of the first embodiment are described. In the first embodiment, the increase amount $\Delta V_{LT}$ of the LT flow rate $V_{LT}$ is calculated to increase the cooling performance $Qw_{LT}$ of the LT cooling circuit 34 by the amount corresponding to the decrease in the cooling performance $Qw_{HT}$ of the HT cooling circuit 32 (margin $\Delta Qw_{HT}$). Instead of this calculation example, the increase amount $\Delta V_{LT}$ of the LT flow rate $V_{LT}$ in response to the decrease in the HT flow rate $V_{HTex}$ may be, for example, a predetermined fixed value. Even in the case of using the simply determined increase amount $\Delta V_{LT}$, at least a part of the margin $\Delta Qw_{HT}$ generated by reducing the heat receiving amount of the HT coolant can be used in the LT cooling circuit 34.

In the response improvement process according to the first embodiment, the ignition timing is advanced in response to the increase in the LT flow rate $V_{LT}$. The response improvement process may be executed without advancing the ignition.

In the response improvement process according to the first embodiment, the flow rate adjustment valve 58 is closed to stop the flow of the HT coolant in the first coolant passage 54 (that is, the HT flow rate $V_{HTex}$ is zero). In a response improvement process according to a second embodiment, the HT flow rate $V_{HTex}$ during the acceleration is variable depending on an operation status of the turbocharged engine 10. The LT flow rate $V_{LT}$ is controlled by the LT pump 62 to increase as the decrease amount of the HT flow rate $V_{HTex}$ increases.

Figure 10:
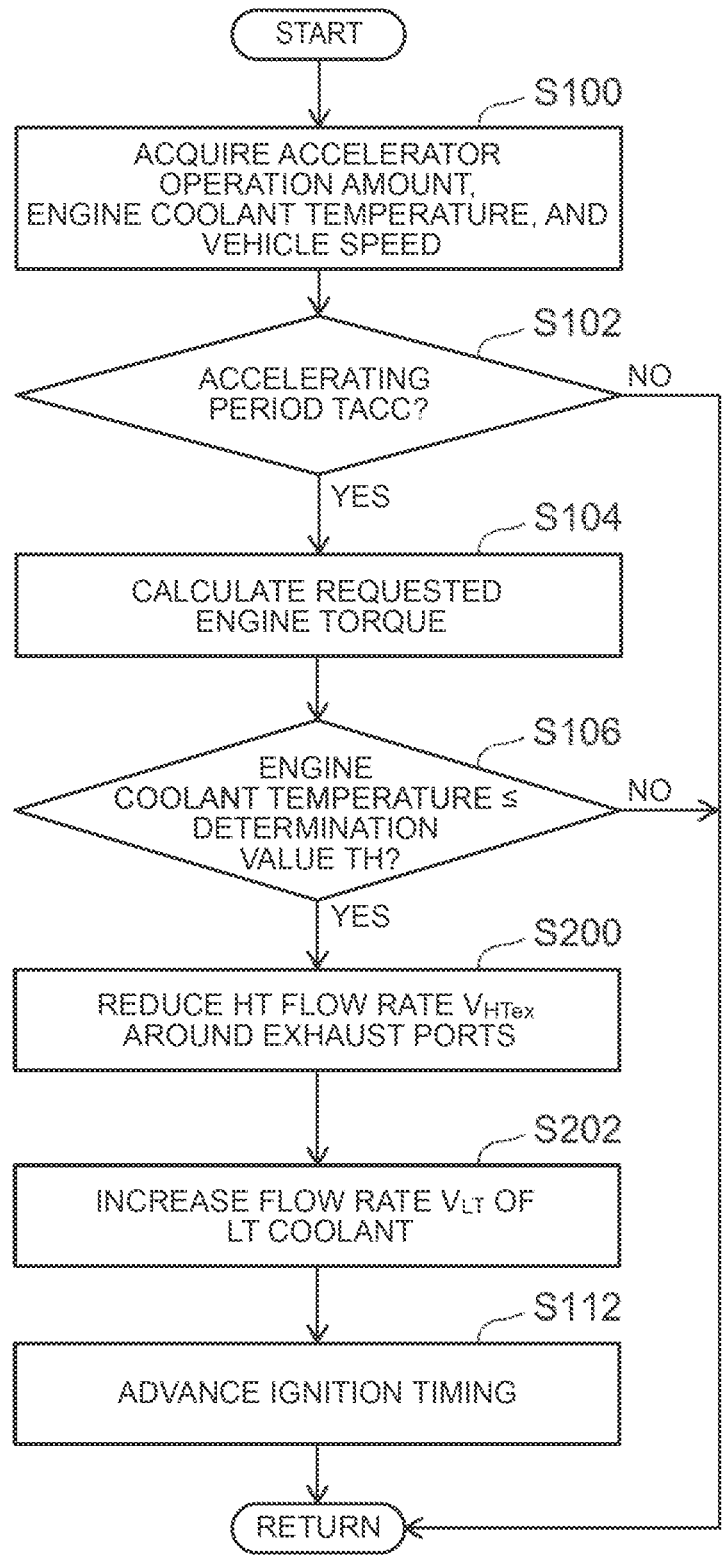
FIG. 10 is a flowchart illustrating an example of a flow of a response improvement process during acceleration according to a second embodiment of the present disclosure.

FIG. 10 is a flowchart illustrating an example of a flow of the response improvement process during the acceleration according to the second embodiment. The process in this flowchart is similar to the process in the flowchart illustrated in FIG. 3 except that Steps S108 and S110 are replaced with Steps S200 and S202.

In FIG. 10, when the engine coolant temperature is equal to or lower than the determination value TH in Step S106, the process proceeds to Step S200. In Step S200, the ECU 70 determines a reduced HT flow rate $V_{HTex}A$, and controls the flow rate adjustment valve 58 to achieve the reduced HT flow rate $V_{H\text{-}rex}A$.

The reduced HT flow rate $V_{HTex}A$ is changed depending on the operation status of the engine 10. Specifically, the HT flow rate $V_{HTex}A$ is changed in consideration of securing the reliability of the exhaust system of the engine 10. For example, the HT flow rate $V_{HTex}A$ is determined (calculated) to decrease as the engine coolant temperature (HT coolant temperature) at the time t1 when the accelerating period TACC has come decreases. More specifically, in the range of the engine coolant temperature equal to or lower than the determination value TH, the HT flow rate $V_{HTex}A$ is determined to decrease as the engine coolant temperature decreases and reach zero when the engine coolant temperature is equal to or lower than a certain value.

In Step S202 subsequent to Step S200, the ECU 70 calculates an increase amount $\Delta V_{LT}$ of the LT flow rate $V_{LT}$ based on the reduced HT flow rate $V_{HTex}A$. An example of a method for calculating the increase amount $\Delta V_{LT}$ is identical to the example in Step S110 with reference to FIG. 4 to FIG. 7. According to this calculation method, the increase amount $\Delta V_{LT}$ is calculated to increase as the decrease amount of the HT flow rate $V_{HTex}$ in the process of Step S200 increases. According to this calculation method, the increase amount $\Delta V_{LT}$ is calculated to increase the cooling performance $Qw_{LT}$ of the LT cooling circuit 34 by an amount corresponding to a decrease in the cooling performance $Qw_{HT}$ of the HT radiator 38 in response to a decrease in the heat receiving amount of the HT coolant along with the selection of the HT flow rate $V_{HTex}A$.

In Step S202, the ECU 70 controls the LT pump 62 to achieve the LT flow rate $V_{LT}$ increased by the calculated increase amount $\Delta V_{LT}$.

In the response improvement process according to the second embodiment, the acceleration response can be improved similarly to the first embodiment. In the first embodiment, the coolant flow around the exhaust ports 18c is uniformly stopped when the engine coolant temperature is equal to or lower than the determination value TH. According to the second embodiment in which the HT flow rate $V_{HTex}$ during execution of the response improvement process is variable (for example, gradually reduced depending on the engine coolant temperature) in consideration of the reliability of the exhaust system, the determination value TH for use in Step S106 can be set higher than that in the first embodiment. In other words, the operation condition to execute the response improvement process (for example, the engine coolant temperature range) can be expanded as compared to that in the first embodiment.

In the second embodiment, the increase amount $\Delta V_{LT}$ of the LT flow rate $V_{LT}$ is calculated to increase the cooling performance $Qw_{LT}$ of the LT cooling circuit 34 by the amount corresponding to the decrease in the cooling performance $Qw_{HT}$ of the HT cooling circuit 32 (margin $\Delta Qw_{HT}$) along with the decrease in the HT flow rate $V_{HTex}$. Instead of this calculation example, the increase amount $\Delta V_{LT}$ may be calculated, without calculating the margin $\Delta Qw_{HT}$, to increase as the decrease amount of the HT flow rate $V_{HTex}$ increases.

What is claimed is:

1. A cooling apparatus for a turbocharged engine, the turbocharged engine including:
   a cylinder head including an exhaust port;
   a turbocharger including a compressor disposed in an intake passage, and a turbine disposed on a downstream side of the exhaust port in an exhaust passage including a passage in the exhaust port; and
   an intercooler disposed on a downstream side of the compressor in the intake passage,
   the cooling apparatus comprising:
      a high-temperature-side cooling circuit including a high-temperature-side pump configured to circulate a high-temperature coolant and a high-temperature-side cooling portion configured to cool the high-temperature coolant, the high-temperature-side cooling circuit being configured to supply the high-temperature coolant to the cylinder head;
      a low-temperature-side cooling circuit including a low-temperature-side pump configured to circulate a low-temperature coolant and a low-temperature-side cooling portion configured to cool the low-temperature coolant, the low-temperature-side cooling circuit being configured to supply the low-temperature coolant to the intercooler; and
      an electronic control unit,
   wherein the high-temperature-side cooling portion and the low-temperature-side cooling portion are shared at least in part,
   wherein the high-temperature-side cooling circuit includes,
      a first coolant passage where the high-temperature coolant flows around the exhaust port,
      a second coolant passage where the high-temperature coolant flows through the cylinder head without flowing around the exhaust port, and
      a flow rate adjustment valve configured to adjust a flow rate of the high-temperature coolant flowing through the first coolant passage, and
   wherein the electronic control unit is configured to, in at least a part of an accelerating period from a start of acceleration of a vehicle including the turbocharged engine to an end of the acceleration, execute a response improvement process for controlling the flow rate adjustment valve to reduce the flow rate of the high-temperature coolant flowing through the first coolant passage, and for controlling the low-temperature-side pump to increase a flow rate of the low-temperature coolant circulating through the low-temperature-side cooling circuit.

2. The cooling apparatus according to claim 1, wherein the electronic control unit is configured to, in the response improvement process, control the flow rate adjustment valve to stop a flow of the high-temperature coolant through the first coolant passage.

3. The cooling apparatus according to claim 2, wherein the electronic control unit is configured to, in the response improvement process, control the low-temperature-side pump to increase the flow rate of the low-temperature coolant to increase a cooling performance of the low-temperature-side cooling circuit by an amount corresponding to a decrease in a cooling performance of the high-temperature-side cooling circuit in response to a decrease in a heat receiving amount of the high-temperature coolant from exhaust gas via the exhaust port.

4. The cooling apparatus according to claim 1, wherein the electronic control unit is configured to, in the response improvement process, control the low-temperature-side pump to increase the flow rate of the low-temperature coolant as a decrease amount of the flow rate of the high-temperature coolant flowing through the first coolant passage increases.

5. The cooling apparatus according to claim 4, wherein the electronic control unit is configured to, in the response improvement process, control the low-temperature-side pump to increase the flow rate of the low-temperature coolant to increase a cooling performance of the low-temperature-side cooling circuit by an amount corresponding to a decrease in a cooling performance of the high-temperature-side cooling circuit in response to a decrease in a heat receiving amount of the high-temperature coolant from exhaust gas via the exhaust port.

6. The cooling apparatus according to claim 1, wherein:
   the turbocharged engine further includes an ignition device; and
   the electronic control unit is configured to, in the response improvement process, control the ignition device to advance an ignition timing in response to an increase in the flow rate of the low-temperature coolant.

* * * * *